United States Patent Office 2,979,469
Patented Apr. 11, 1961

2,979,469

PRODUCTION OF PHENOLIC FOAMS

Richard F. Shannon, Lancaster, Charles A. Matuszak, Columbus, Leo G. Adams, Newark, and George W. Gillaum, Granville, Ohio, assignors to Owens-Corning Fiberglas Corporation, a corporation of Delaware No Drawing. Filed Dec. 30, 1957, Ser. No. 705,744

3 Claims. (Cl. 260—2.5)

This invention relates to the production of phenolic foams, and, more particularly, to the production of such foams having greatly improved toughness by comparison with previously known phenolic foams, and, if desired, a substantial degree of resiliency.

Various phenolic resins have heretofore been converted to a foamed, thermoset condition. The resulting foams, however, have heretofore been extremely fragile, with the result that they have found only limited use.

The present invention is based upon the discovery that various phenolic materials can be converted to a foamed, thermoset or cured, condition in which they have substantially improved strength and toughness characteristics, and, if desired, are also resilient.

It is, therefore, an object of the invention to provide improved foamed, thermoset phenolic materials.

It is a further object of the invention to provide a method for producing improved foamed, thermoset, phenolic materials.

It is still another object of the invention to provide a new foamable phenolic composition.

Other objects and advantages will be apparent from the description which follows, which is intended only to illustrate and disclose, but in no way to limit, the invention.

According to the invention, a method for producing a foamed, thermoset phenolic material is provided. Such method comprises mixing a particular thermosettable phenol-formaldehyde partial condensation product, in a dispersion, a plurality of blowing agents effective to form a compressible fluid throughout at least three different temperature ranges between 50° C. and 105° C., at least one of the blowing agents being also a water-soluble solvent for the condensation product effective to increase the compatibility of the condensation product with water as condensation proceeds, a surface-active agent effective to lower the surface tension of the composition, an acid condensing agent for the phenol-formaldehyde condensation product, an acid sequestering agent effective to sequester at low temperatures within the range from 20° C. to 100° C., and to release at high temperatures within such range, a portion of the acid condensing agent, and from 5 percent to 35 percent of water based upon the total of water and solids in the foamable composition, whereby a foamable composition is effected and spontaneous foaming and curing thereof proceed. Preferably, the composition also includes a formaldehyde sequestering agent effective to sequester substantially all of the free formaldehyde present in the composition.

The terms "percent" and "parts" are used herein and in the appended claims to refer to percent and parts by weight, unless otherwise indicated.

The term "sequestering agent" is used in its usual sense to refer to a component of a composition which effectively inhibits, at least under certain conditions, a second component from undergoing its usual reactions. The name of the second component, which is inhibited from undergoing its usual reactions, is used as an adjective defining "sequestering agent." For example, a "formaldehyde sequestering agent" is a component of a composition which effectively inhibits formaldehyde from undergoing its usual reactions; urea is a specific example of a "formaldehyde sequestering agent."

The particular phenol-formaldehyde partial condensation product is one having a mol ratio of formaldehyde to phenol of from 1.8 to 2.2 and from 0.1 percent to 10 percent of free formaldehyde, based upon total resin solids. The partial condensation product must also be miscible with water to the extent of at least 30 percent, and must have a viscosity, in a 70 percent solids water dispersion, of at least 100 centipoises at 40° C. It is preferred that the free formaldehyde content of such partial condensation product be from 1 percent to 5 percent, based upon total resin solids.

When phenol and formaldehyde react, condensation products of relatively low average molecular weight are first produced, and the average molecular weight of the condensation products then increases with further condensation. As average molecular weight of the condensation products increases, the viscosity of a dispersion thereof also increases, and the water compatibility or miscibility of the condensation products decreases. Therefore, specifying a minimum viscosity, as above, specifies a minimum average molecular weight, in terms of a property which can be measured accurately, and specifying a minimum water compatibility specifies a maximum average molecular weight in terms of a property which can be measured accurately.

As is indicated above, a foamable composition according to the invention includes a plurality of blowing agents effective to form a compressible fluid throughout at least three different temperature ranges between 50° C. and 105° C. Optimum results have been achieved using a diazo compound such as diazoaminobenzene as one blowing agent. It has been found to be essential to use, in addition to water which also acts as a blowing agent in a foamable composition according to the invention, at least one liquid blowing agent such as methyl alcohol, which is a water miscible solvent for the condensation product. Diazoaminobenzene, for example, reacts slowly with an acid reacting curing agent in a composition according to the invention, the reaction producing nitrogen which acts as a blowing agent. The rate of reaction between diazoaminobenzene and the acid reacting curing agent, and, therefore, the rate of generation of nitrogen as a blowing agent, increases substantially as the temperature of the composition increases, for example because of exothermic condensation of the phenol-formaldehyde product. The methanol or other liquid blowing agent is effective as a blowing agent only in a temperature range near its boiling point, and water becomes effective as a blowing agent at still higher temperatures. Preferably, the blowing agents are effective at temperatures throughout the range of 50° C. to 105° C. As methanol or other volatile blowing agents and water are vaporized, the composition, which is now foaming, is cooled by an amount which is equal to the latent heats of vaporization of the blowing agents. This cooling tends to retard the cure of the phenol-formaldehyde condensation product, since such cure proceeds at a rate which is a direct function of temperature. Other water insoluble vaporizable blowing agents such as benzene and isopropyl ether have also been used to advantage in a foamable composition according to the invention, and others which are water-miscible solvents for the condensation product, such as ethyl alcohol, n-propyl alcohol, isopropyl alcohol, secondary butyl alcohol, tertiary butyl alcohol and the like can also be similarly used.

A characteristic has been observed in compositions according to the invention which is significantly different from previously known foamable phenolic compositions. This characteristic can be described as a lack of dependence, during foaming, upon a relatively tough surface skin. Previously known foams have exhibited such a skin, which is usually cut away after curing of the phenolic material has been completed, and have seemed to require such skin for satisfactory foaming. For example, when a previously known foamable phenolic composition is placed in a suitable cup and allowed to foam, a mass of material moves upwardly from the cup; if this mass of material is severed, for example with the blade of a spatula, foaming will virtually cease in the material which remains in the cup, and may or may not resume after a substantial time lag, depending upon the condition of the phenolic material at the time the cut was made. The material above the cut is set or cured, and does not expand further to any appreciable extent in any case. This characteristic of previously known phenolic foams is believed to indicate that the tough skin is essential for foaming such compositions. The individual cells within the foaming material apparently are incapable of confining the gaseous blowing agent; instead, the blowing agent is confined by the tough skin, and the composition foams as a whole within such skin. When the skin is severed, the blowing agent is no longer confined thereby, and escapes from the composition, so that foaming virtually ceases. If the skin is severed at a sufficiently early stage in the foaming and curing cycle, a new skin may form over the surface exposed by the cut, and some further foaming may occur before cure proceeds to such an extent that foaming is impossible. However, the subsequently foamed material will expand only a relatively slight amount compared to the expansion which would have occurred had the skin not been severed.

A composition according to the invention does not require a skin for foaming to occur; if a foaming mass of a composition according to the invention is severed, as described, foaming continues, both above and below the cut, and is not appreciably affected by the cut. This different characteristic in a composition according to the invention indicates that foaming occurs as a localized phenomenon within the mass rather than as a general phenomenon throughout the entire mass which is enclosed within the confining skin.

Localized foaming within a mass, as distinguished from mass foaming, is an important characteristic in many practical applications for foamable compositions. It is often desirable to produce a foamed in situ insulation under conditions such that severing of the tough exterior skin which is responsible for foaming in previously known compositions is inevitable, for example when braces or supports extend through the space into which the insulation is to be foamed. Such supports rupture the skin and prevent effective foaming of previously known compositions, but have little or no effect upon the foaming of compositions according to the invention. In addition, phenolic compositions which must be confined within such skins for foaming thereof to occur cannot, so far as is known, be foamed satisfactorily except from an appreciable mass having a substantial thickness. As a consequence, cured foams produced therefrom have a minimum thickness of about six inches. Compositions according to the invention, however, do not behave in this way; excellent foams having a minimum thickness less than about one inch have been produced.

Several constituents in a composition according to the invention cooperate to cause the new characteristic of foaming which has been discussed. As has been indicated, the methanol or other water soluble blowing agent is also a solvent for the phenol-formaldehyde condensation product; methanol or the like, therefore, increases the compatibility of the condensation product with the water therein as cure progresses. The increased compatibility of the resin with water presents separation of water from the resin until cure has proceeded to a greater degree.

Separation of water from resin tends to weaken the walls which surround the individual cells formed by the blowing agent. If separation occurs too early in the resin curing cycle, the weakening is to an extent such that the walls are incapable of confining the blowing agent, and confining can be accomplished only by the relatively tough skin which surrounds the foaming mass. When, however, methanol or other water soluble solvent for the resin is used as a blowing agent, separation of water and resin is postponed until cure of the resin has proceeded to a stage at which the individual cell walls have sufficient strength to confine the blowing agent.

An effective wetting agent is also an essential constituent of a composition according to the invention. Sorbitan monopalmitate has been found to be an effective surface active agent for use in such a composition. By reducing surface tension, the sorbitan monopalmitate or other surface active agent enables the individual cell walls to confine the blowing agent while the walls are composed principally of a water dispersion of the resin or phenol-formaldehyde product; the methanol or other water soluble blowing agent extends the time during which the cell walls are composed principally of a water dispersion of the product until the product has cured to an extent such that separation of water therefrom does not cause rupture of the cell walls. The combined action of methanol or the like and the surface active agent also enables the production of foam having an extremely fine pore structure, for example of the order of about 7 mils or less. Various surface active agents other than sorbitan monopalmitate can also be employed in a composition according to the invention. For example polyoxylated vegetable oils, polyoxyethylene sorbitan esters of fatty acids, generally, alkylphenyl polyethylene glycol ethers, polyethylene glycol esters of oleic acid, nonylphenol ethylene oxide, surfactants, iso-octyl phenoxy polyoxyethylene ethanols, and alkylphenyl polyglycol ethers have all been used in place of sorbitan monopalmitate, and with satisfactory results.

In general, the surface active agent should be one which lowers the surface tension of the foamable composition to not more than 45 dynes per centimeter, and must be one which is compatible and not reactive with the various constituents of the composition, and which is stable at temperatures up to about 100° C. A particularly advantageous class of surfactants can be represented by the generic formula $$R-O-G-O-CH_2-CH_2-OH$$

where R is an aromatic, an alicyclic or an aliphatic hydrocarbon or an aromatic-, an alicyclic- or an aliphatic- hydroxy-substituted hydrocarbon, and G is a residue from a polyoxyalkylene formed by removal of the two terminal hydroxyls. Such surfactants are non-ionic.

When methanol is omitted from a composition according to the invention, and isopropyl ether is substituted therefor, as is subsequently described by way of example, relatively friable foams having a large average pore size are produced, rather than tough foams having high compressive strengths, and low average pore size. Isopropyl ether and methanol boil at substantially the same temperature. Isopropyl ether, however, is substantially insoluble in water, while methanol is miscible with water in all proportions. It is believed, therefore, that the water miscibility of methanol is responsible for the significant difference in properties of the two foams, and for reasons which have been discussed previously. This belief is furthered by the observation that other water soluble solvents for a phenol-formaldehyde condensation product can be used in place of methanol with results which are similar, and differ only in ways which can be explained on the basis of differences in boiling point and solvent action.

A composition according to the invention must also include an acid condensing agent for the phenol-formaldehyde condensation product. Strong acids having a dissociation constant of at least $10^{-3}$, such as hydrochloric, sulfuric, benzene sulfonic, phenol sulfonic, toluene sulfonic, benzene disulfonic, trichloroacetic and the like acids give excellent results. Other strong acid condensing agents can also be employed.

In addition, a composition according to the invention preferably includes a formaldehyde sequestering agent which is effective to sequester substantially all of the free formaldehyde therein. Urea can be used as a formaldehyde sequestering agent, and is believed to be effective by forming urea-formaldehyde condensation products. Various other materials known to be reactive with free formaldehyde in a similar way can also be used in place of urea, for example, guanidine, thiourea, melamine, hydroxyl amine, hydroxyl amine acid salts, hydrazine, acetamide, and urea hydrochloride. It has been found that free formaldehyde in a foamable composition interferes with foaming. The reason for such interference is not understood, but the phenomenon has been observed repeatedly. The function of the formaldehyde sequestering agent, when used, is to react with or otherwise sequester the free formaldehyde so that it does not interfere with foaming of the identified phenol-formaldehyde partial condensation product. It has been found that substantially improved properties can be achieved by using a phenol-formaldehyde product containing free formaldehyde, and that the adverse effect of the free formaldehyde can be overcome by using urea or another formaldehyde sequestering agent.

A foamable phenolic composition according to the invention also comprises from 5 percent to 35 percent of water, based upon the total of water and solids in the composition. At least 5 percent of water is essential, and functions as what may be denominated a "heat sump" to prevent undesirably fast curing of the phenol-formaldehyde partial condensation product. As has been discussed above, the curing of a phenol-formaldehyde product is an exothermic reaction, and proceeds at a rate which is a direct function of its temperature. The water in a composition according to the invention is maintained at essentially the same temperature as the curing phenolic resin, some of the exotherm of curing being dissipated in heating the water, so that the rate of heating of the product, and, accordingly, the rate of cure thereof, are retarded by the water. In addition, at least a portion of the water is vaporized during foaming and curing of the composition. Vaporization of the water further stabilizes the composition against overheating, and also provides a blowing agent effective at relatively high temperatures, after all methanol and benzene, for example, have been vaporized. The amount of water in a composition according to the invention, however, should not be greater than 35 percent, based upon the total of water and solids therein. An important feature of such composition is water compatibility of the phenol-formaldehyde condensation product as cure progresses. Methanol or another blowing agent which is a water miscible solvent for the condensation product is an essential constituent for this purpose. When the water content of the composition is greater than 35 percent, a large amount of methanol, or the like, is required. As has been discussed above, both the methanol or the like and the water constitute what has been denominated "heat sumps" which retard the rate at which the composition is heated during curing, and, therefore, retard the cure. When the composition contains more than 35 percent of water, curing is so difficult as to be impracticable. Optimum results have been achieved with compositions containing from 5 percent to 15 percent of water, based upon the total of water and solids.

An acid sequestering agent effective to sequester, at low temperatures within the range from 20° C. to 100° C., and to release at high temperatures within such range, a portion of the acid condensing agent is also used in a foamable composition according to the invention. Urea, in addition to serving as a formaldehyde sequestering agent, as discussed above, can also be used as an acid sequestering agent, being reactive with hydrochloric acid, for example, to produce urea hydrochloride. Other acid sequestering agents which can be used include triethanolamine, hydroxyl amine, hydrazine, triethylamine, pyridine, phenylenediamine, and acetamide. In general, any nitrogen-containing base which forms, with an acid, a complex having a pH not greater than 5 can be used as an acid sequestering agent. The pH of the foamable composition, itself, should be not greater than 2.

It is important, in producing a cured phenolic foam from a composition according to the invention, to provide a thermal balance. As has been indicated above, the curing of the phenol-formaldehyde product is an exothermic reaction. The exotherm supplies heat which is necessary both to vaporize the volatile blowing agents and to effect satisfactory cure of the phenolic material. As foaming progresses, the composition becomes an effective thermal insulator which interferes substantially with temperature control by external heating or cooling. It is preferred, therefore, in producing cured foams from such compositions, to control composition temperature so that the exotherm is substantially sufficient to heat the composition, during foaming and curing, to the requisite temperature. Where, as is frequently the case, foaming and curing are carried out in some sort of a mold comprising at least upper and lower platens, initial temperature control can be effected by heating or cooling the platens, principally to vary the nature of foaming, to prevent loss of heat, and to control surface temperature. Externally applied or removed heat should, however, be relied upon only for close temperature control, with the broad control being the initial temperature at which the foaming composition is provided.

It is convenient to mix the phenol-formaldehyde condensation product, the blowing agents, the surface active agent and some of the water, and to control the temperature of this mixture to achieve a desired result. Any solid constituents, for example a diazo compound, should be finely divided to achieve optimum results. This composition is then thoroughly blended with the acid condensing agent and acid sequestering agent, which are also mixed with the remainder of the water to be introduced into the foamable composition. Thorough mixing of these two portions of the composition is essential, but can be readily accomplished in a commercially available pump-type bladed mixer to which separate streams, one stream being the phenol-formaldehyde product comprising mixture, and the other being the water-acid-condensing agent mixture, are fed, and from which a single stream of the foamable composition is delivered. The composition which is delivered from the mixer will foam and cure under ambient conditions at ordinary room temperatures, which are usually from 20 to 30° C., or a measured charge thereof can be poured into a suitable mold in contact with a platen which is either heated or cooled to achieve lower- or higher-density foams, as may be desired.

It is usually preferred, in producing a cured phenolic foam from a composition according to the invention, that the phenol-formaldehyde condensation product be converted to a thermostat condition at about the time that the rate at which blowing agent is vaporized within the composition begins to decline, or shortly thereafter. The cell walls in a curing composition according to the invention are not completely impervious to vapors. As a consequence, what can be described as a dynamic equilibrium is established during the final stages of cure of a phenolic foam produced from a composition according to the invention. Exothermic heat generated by curing of the phenolic material causes vaporization of one or more of the blowing agents. Blowing agent vapors are trapped within the composition, and form a large number of pockets which are separated from one another by films of the phenol-formaldehyde condensation product. Vapors also move through the cell walls from pocket to pocket, and to the exterior of the foaming mass. So long as new vapors are formed at a rate at least as high as that at which vapors escape from the mass, the condition which has been described as a dynamic equilibrium exists within the mass. Ultimately, however, the rate at which heat is released by the exothermic reaction, and, consequently, the rate at which a blowing agent is vaporized begins to decrease, with the result that vapors tend to escape from the mass at a rate greater than that at which they are generated. This phenomenon can be observed by varying the amount of an acid condensing agent, or of a mixture of an acid sequestering agent and an acid condensing agent, which is mixed with each of a plurality of identical samples comprising a phenol-formaldehyde partial condensation product, a surface active agent, a plurality of blowing agents and water. It will be found that there is a particular ratio of acid condensing agent to phenol-formaldehyde product above which cells which are generally spherical, or have some regular configuration other than spherical, are produced in the ultimate foams. When, however, the proportion of acid condensing agent or of acid condensing agent and acid sequestering agent is lower, so that cure proceeds at a slower rate, the cells are found to have concave sides, indicating that the following chain of events occurred during foaming: (1) the rate of vapor evolution decreased while the cell walls were still in a plastic condition; (2) the pressure inside each of the cells was lowered; and (3) the walls defining each of the cells contracted somewhat. Foams produced from compositions according to the invention in the manner described, and having contracted, concave cell walls have been found to have resilient characteristics, a property not heretofore achieved in phenolic foams, so far as is known. Foams produced from a composition according to the invention and having spherical or other regular configurations in the cell walls have much smaller pore sizes than have heretofore been achieved with phenolic foams, and substantially improved toughness. When shrinkage is avoided, it is usually preferred that the condensation product is converted to a thermoset condition shortly prior to the decline in rate of blowing agent vaporization.

The following examples are presented solely for the purpose of further illustrating and disclosing, and are in no way to be construed as limitations upon, the invention.

EXAMPLE 1

A series of foamable phenolic compositions according to the invention was produced from a particular dispersion of a phenol-formaldehyde partial condensation product which is hereinafter referred to as "Resin A," and is subsequently identified in detail. A first dispersion was produced from 1000 parts of Resin A, 50 parts of sorbitan monopalmitate, 60 parts of a finely ground mixture of diazoaminobenzene and diatomaceous earth in the proportions of 100 parts of diazoaminobenzene to 10 parts of the diatomaceous earth, 45 parts of methanol, and 35 parts of benzene. This dispersion was placed in a storage vessel, and heated to a temperature of substantially 40° C. A second dispersion at a temperature of about 25° C. was then prepared by mixing 50 parts of urea with 150 parts of 37 percent hydrochloric acid. The first and second dispersions were then pumped into a pump-type, fast acting, bladed mixer at the relative rates of 1190 parts per minute and 200 parts per minute, respectively. A uniform dispersion of Resin A, sorbitan monopalmitate, diazoaminobenzene, diatomaceous earth, methanol, benzene, hydrochloric acid and urea was discharged from the pump-type mixer. A 169 gram portion of this uniform dispersion was charged into an open-topped, right parallelepipedal mold. The vertical sides of the mold were approximately 2 inches high, and the rectangular base was approximately 15 inches x 15 inches, and was heated to 93° C. A cover heated to 121° C. was then placed over the mold to enclose the foamable composition therein, except for about 30 small vent holes approximately ⅛ inch in diameter. Prior to introduction of the foamable composition into the mold, the interior walls thereof, and the interior wall of the upper platen had been coated with a commercially available silicone grease to prevent sticking of the cured foam. Approximately 10 minutes after the mold was closed, the cover was removed and a tough, cured phenolic foam having a density of substantially 1 pound per cubic foot and an average cell size of about 5 mils was removed from the mold. The interior of the foam had a compressive strength of from 720 to 980 pounds per square foot at maximum load, and a K value of about 0.22 B.t.u. per hour per square foot per degree Fahrenheit per inch of thickness.

When the procedure described in the preceding paragraph was repeated except that 45 parts of either ethanol or isopropanol were substituted for the 45 parts of methanol, similar results were obtained except that, as determined by observing foaming of the mixed composition from an open cup, it was noted that the curing phenol-formaldehyde product was somewhat stiffer or more viscous during foaming and curing than when methanol was used as the combined blowing agent and water miscible solvent for the partial condensation product. This difference is believed to be attributable to the higher boiling points of both ethanol and isopropanol. Cure had proceeded to a greater degree before either of these solvents was vaporized, and the greater stiffness was attributable to the higher degree of cure.

When, for purposes of comparison, but not in accordance with the invention, the procedure described in Example 1 was repeated except that 45 parts of isopropyl ether were substituted for the 45 parts of methanol, the finally cured product was a coarse-celled, friable foam having pores ranging up to about 1 inch. Attempts were made to improve the product by varying the proportion of the dispersion of urea in 37 percent hydrochloric acid, but neither reducing the proportion to as little as 100 parts nor increasing it to as much as 300 parts appreciably changed the characteristics of the product.

The procedure described in Example 1 has also been used to produce other foams having different densities. The compositions of the first and second dispersions, the relative proportions of each, the amount of the mixture charged to the identified mold, the temperatures of the upper and lower mold platens, and the densities of the finally cured products are given in the following table:

Table I

| Sample No. | Resin A | Dispersion 1 | | | | Dispersion 2 | | Parts of dispersion 1 | Parts of dispersion 2 | Lower mold platen temperature, °C. | Upper mold platen temperature, °C. | Density of cured foam in pounds per cubic foot |
|---|---|---|---|---|---|---|---|---|---|---|---|---|
| | | Sorbitan monopalmitate | Diazoaminobenzene-diatomaceous earth mixture | Methanol | Benzene | Hydrochloric acid | Urea | | | | | |
| 4 | 1,000 | 50 | 60 | 20 | 60 | 112½ | 37½ | 1,190 | 150 | ------ | ------ | 2 |
| 5 | 1,000 | 50 | 60 | 45 | 35 | 112½ | 37½ | 1,000 | 168 | 200 | 250 | 1.0 |
| 6 | 1,000 | 50 | 60 | 60 | 20 | 112½ | 37½ | 1,000 | 152 | 120 | 250 | 1.5 |
| 7 | 1,000 | 50 | 60 | 35 | 35 | 112½ | 37½ | 1,000 | 126 | 200 | 210 | 2.0 |
| 8 | 1,000 | 50 | 60 | 10 | 60 | 112½ | 37½ | 1,000 | 120 | 130 | 225 | 2.5 |
| 9 | 1,000 | 50 | 60 | 35 | 25 | 112½ | 37½ | 1,000 | 130 | 130 | 250 | 3.0 |

Resin A was produced from 66.6 parts of formaldehyde, added as 37 percent formalin, 100 parts of phenol and 4 parts of sodium hydroxide. The starting materials were mixed in a suitable vessel, allowed to stand at room temperature (about 25° C.) for approximately 16 hours, and heated at a progressively increasing temperature which was sufficient to maintain gentle boiling thereof. Heating was discontinued when the temperature of the reaction mixture reached approximately 85° C. The sodium hydroxide in the reaction mixture was then neutralized with phosphoric acid, and the neutralized resin was filtered. The filtered resin was then subjected to a vacuum distillation to remove water to a solids content of 76.2 percent.

In determining solids content of Resin A, a weighed portion thereof was heated at 300° F. for two hours, and the final weight of the resin portion was determined. Solids content, in percent, was considered to be 100 times the final weight divided by the initial weight.

Resin A was found to contain 5.1 percent of free formaldehyde, and to have a viscosity of 1600 centipoises at 40° C. The free formaldehyde determination was based upon resin solids, and was calculated to be 100 times the weight of free formaldehyde found in a sample of the resin divided by the weight of resin solids in the sample. Weight of resin solids was calculated by multiplying 1/100 of percent solids (0.762) times the sample weight.

The procedures described in Example 1, and summarized in the preceding table, have also been used to produce cured phenolic foams reinforced with glass fibers and also with excelsior. Mats produced from relatively coarse fibers of glass (approximately 1.6 mils diameter) have been used satisfactorily. Cured phenolic foams have been produced by introducing the foamable composition into the mold and then placing a mat of fibers over the composition and closing the mold. In addition, reinforced foams have been produced by placing a mat of the fibers in the mold and pouring the foamable composition over the mat, as well as by introducing a plurality of relatively thin mats into the mold, one after another, and pouring the foamable composition over each successive mat as introduced into the mold, and, in each case, then closing the mold.

In general, relatively coarse glass fibers are preferred for reinforcing phenolic foams. Good results have been obtained using fibers ranging from about 0.5 mil to about 2 mils in diameter, and optimum results with glass fibers ranging from about 1 mil to about 1.6 mil in diameter. Extremely fine fibers, if desired, can also be used adjacent the major surfaces of foamed articles. For example, mats produced from strand composed of 204 parallel glass fibers, and weighing 1 pound for every 45,000 yards of strand length, have been placed adjacent the bottom platen of the previously described mold; a charge of a foamable composition, as described above, and a mat of coarse glass fibers (0.5 mil to 2 mils in diameter) or excelsior has been placed above the fine fiber mat; a second mat of the fine fibers has then been placed on the top of the charge in the mold; and the upper platen has been lowered into position. This procedure produces a reinforced cured phenolic foam with decorative surfaces.

It has been found that cured phenolic foams reinforced with glass fibers, as described, are resistant to relatively high temperature flames. When such foams are placed in a direct flame, the cured phenolic material will char, and may glow to a limited extent, but no flame is visible which can be attributed to combustion of the phenolic material, and only the portion of the foam which is in the direct flame is affected to any appreciable extent.

It will be appreciated that the procedure described above for the production of Resin A constitutes a preferred method for producing a phenolic material for use as a constituent in a foamable composition according to the invention. However, the specific procedure described can be varied substantially, if desired. For example, the reaction mixture can be allowed to stand at room temperature for either a longer or a shorter period of time than the 16 hour period indicated, or this standing period can be eliminated altogether. It is believed that, when the reaction mixture stands at about room temperature, or at a temperature up to about 40° C., reaction proceeds at a slow rate between phenol and formaldehyde to produce methylol phenol groups before resinification occurs to any appreciable extent, and the properties of the final condensation product appear to be somewhat improved. However, satisfactory properties are achieved even when the starting materials are mixed and heating is then begun immediately. Also, the final temperature of the condensation reaction can be varied, for example from about 80° C. to about 95° C.

Where ratios of formaldehyde to phenol are given, herein, and in the appended claims, it is to be understood that ratios of starting materials are designated. It is known that some formaldehyde is lost from phenol-formaldehyde reaction mixtures during condensation, but the precise amount is difficult to determine. As a consequence, the only reliable point at which formaldehyde to phenol ratios can be readily determined is in the initial charge of starting materials.

It will be apparent that various changes and modifications can be made from the specific details disclosed herein without departing from the spirit and scope of the attached claims.

What we claim is:

1. A method for producing a foamed, thermoset phenolic material which comprises mixing the following reactants in the indicated proportions: a dispersion of a thermosettable phenol-formaldehyde partial condensation product having a mol ratio of formaldehyde to phenol of from 1.8 to 2.2 and from 0.1 percent to 10 percent of free formaldehyde, based upon total resin solids, said partial condensation product being miscible with water to the extent of at least 30 percent, and having a viscosity, in a 70 percent solids water dispersion, of at least 500 centipoises at 40° C., the resin solids constituting from 40 percent to 60 percent of the composition; a plurality of blowing agents effective to form a compressible fluid throughout at least three different temperature ranges between 50° C. and 105° C., and including from 1 percent to 10 percent of a diazo blowing agent, from 1 percent to 10 percent of a lower aliphatic alcohol having from 1 to 4 carbon atoms, and from 5 percent to 35 percent of water based upon the total of water and solids in the foamable composition; from 1 percent to 7 percent of a surface-active agent effective to lower the surface tension of the composition, said agent being selected from the group consisting of sorbitan monopalmitate, polyoxylated vegetable oils, polyoxyethylene sorbitan esters of fatty acids, polyethylene glycol esters of oleic acid, nonyl-phenol ethylene oxides, isooctyl phenoxy polyoxyethylene ethanols and alkylphenyl polyglycol ethers; from 2 percent to 7 percent of an acid having a dissociation constant of at least $10^{-3}$ as a condensing agent for the phenol-formaldehyde condensation product; and from 2 percent to 7 percent of urea, whereby a foamable composition is effected and spontaneous foaming and curing thereof proceed.

2. A method as claimed in claim 1 wherein the diazo blowing agent is diazoaminobenzene.

3. A method as claimed in claim 2 wherein the acid condensing agent is hydrochloric acid.

References Cited in the file of this patent

UNITED STATES PATENTS

| | | |
|---|---|---|
| 1,944,143 | Bender | Jan. 16, 1934 |

FOREIGN PATENTS

| | | |
|---|---|---|
| 578,838 | Great Britain | July 15, 1946 |
| 758,562 | Great Britain | Oct. 3, 1956 |